US009450447B2

(12) United States Patent
Akiyoshi et al.

(10) Patent No.: US 9,450,447 B2
(45) Date of Patent: Sep. 20, 2016

(54) ELECTRONIC SYSTEM FOR NOTIFYING USER OF BATTERY CHARGING STATE

(71) Applicant: SONY CORPORATION, Minato-ku (JP)

(72) Inventors: Koichi Akiyoshi, Chiba (JP); Yoichi Uramoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 231 days.

(21) Appl. No.: 14/352,906

(22) PCT Filed: Nov. 15, 2012

(86) PCT No.: PCT/JP2012/079615
§ 371 (c)(1),
(2) Date: Apr. 18, 2014

(87) PCT Pub. No.: WO2013/080802
PCT Pub. Date: Jun. 6, 2013

(65) Prior Publication Data
US 2014/0266037 A1    Sep. 18, 2014

(30) Foreign Application Priority Data

Nov. 30, 2011  (JP) ................................. 2011-262070
Apr. 18, 2012  (JP) ................................. 2012-094336

(51) Int. Cl.
*H02J 7/02*       (2016.01)
*H02J 17/00*      (2006.01)
*H02J 7/00*       (2006.01)

(52) U.S. Cl.
CPC ................ *H02J 7/025* (2013.01); *H02J 17/00* (2013.01); *H02J 2007/0096* (2013.01)

(58) Field of Classification Search
CPC ... H02J 7/025; H02J 17/00; H02J 2007/0096
See application file for complete search history.

(56) References Cited

U.S. PATENT DOCUMENTS 7,151,357 B2 * 12/2006 Xian ................... G06F 3/03543
                                                320/108
7,443,135 B2 * 10/2008 Cho ......................... H02J 7/025
                                                320/108

(Continued)

FOREIGN PATENT DOCUMENTS

JP    2001-102974 A    4/2001
JP    2002-034169 A    1/2002

(Continued)

OTHER PUBLICATIONS

International Search Report issued Jan. 29, 2013 in PCT/JP2012/079615.

(Continued)

*Primary Examiner* — Naum B Levin
(74) *Attorney, Agent, or Firm* — Chip Law Group

(57) ABSTRACT

An electronic unit includes an electricity reception section configured to receive power transmitted using one of a magnetic field and an electric field, a secondary battery configured to be charged based on a received power received by the electricity reception section, and a state notification section configured to provide notification to outside as to a state of its own unit. A charging period during which the secondary battery is charged based on the received power and a non-charging period are set in a time-divisional manner. The state notification section notifies of the unit state based on the received power in both of the charging period and the non-charging period.

14 Claims, 11 Drawing Sheets

(56) References Cited

U.S. PATENT DOCUMENTS

| | | | | |
|---|---|---|---|---|
| 8,000,800 | B2* | 8/2011 | Takeda | A61N 1/3787 607/60 |
| 8,064,825 | B2* | 11/2011 | Onishi | H04B 1/3883 327/33 |
| 8,129,942 | B2* | 3/2012 | Park | H02J 7/025 320/106 |
| 8,188,854 | B2* | 5/2012 | Yamashita | H02J 7/025 320/108 |
| 8,405,348 | B2* | 3/2013 | Kawai | H01M 10/443 320/112 |
| 8,415,834 | B2* | 4/2013 | Suzuki | H02J 7/025 307/104 |
| 8,890,470 | B2* | 11/2014 | Partovi | H01F 7/0252 320/108 |
| 8,896,321 | B2* | 11/2014 | Taguchi | B60L 3/00 324/503 |
| 2005/0165461 | A1* | 7/2005 | Takeda | H02J 7/025 607/61 |
| 2008/0200119 | A1* | 8/2008 | Onishi | H04B 1/3883 455/41.1 |
| 2008/0211455 | A1* | 9/2008 | Park | H02J 7/025 320/108 |
| 2008/0303479 | A1 | 12/2008 | Park et al. | |
| 2009/0021219 | A1 | 1/2009 | Yoda et al. | |
| 2010/0001845 | A1* | 1/2010 | Yamashita | H02J 7/025 340/10.4 |
| 2010/0079000 | A1* | 4/2010 | Yamamota | H02J 7/0027 307/39 |
| 2011/0043166 | A1* | 2/2011 | Kawai | H01M 10/443 320/112 |
| 2011/0074344 | A1* | 3/2011 | Park | H01F 38/14 320/108 |

FOREIGN PATENT DOCUMENTS

| | | |
|---|---|---|
| JP | 2005-110399 A | 4/2005 |
| JP | 2008-206233 A | 9/2008 |
| JP | 2009-504116 A | 1/2009 |
| JP | 2010-063245 A | 3/2010 |
| JP | 2011-055669 A | 3/2011 |
| JP | 2011-155836 A | 8/2011 |
| WO | WO 00/27531 A1 | 5/2000 |

OTHER PUBLICATIONS

U.S. Appl. No. 14/352,777, filed Apr. 18, 2014, Akiyoshi, et al.

* cited by examiner

ELECTRONIC SYSTEM FOR NOTIFYING USER OF BATTERY CHARGING STATE

TECHNICAL FIELD

The present disclosure relates to a power feeding system that performs power supply (electricity transmission, or power transmission) in a noncontact manner to a power-feeding objective unit such as an electronic unit, and relates to an electronic unit applicable to such a power feeding system.

BACKGROUND ART

Recently, attention has been focused on a power feeding system (a noncontact power feeding system or a wireless charging system) that performs power supply (electricity transmission, or power transmission) in a noncontact manner to CE devices (Consumer Electronics Devices) such as a mobile phone and a portable music player. Such a noncontact power feeding system makes it possible to start charging only by placing an electronic unit (a secondary unit) on a charging tray (a primary unit) instead of inserting (connecting) a connector, such as an AC adaptor, of a power supply unit into a unit. In other words, terminal connection between the electronic unit and the charging tray is not necessary.

An electromagnetic induction method is well known as a method of performing power supply in such a noncontact manner. Recently, attention is further focused on a noncontact power feeding system adopting a method referred to as magnetic resonance method using an electromagnetic resonant phenomenon. For example, PTL 1 to PTL 6 each disclose such a noncontact power feeding system.

CITATION LIST

Patent Literature

PTL 1: JP 2001-102974A
PTL 2: WO 00/27531A
PTL 3: JP 2008-206233A
PTL 4: JP 2002-34169A
PTL 5: JP 2005-110399A
PTL 6: JP 2010-63245A

SUMMARY OF INVENTION

In the noncontact power feeding system as described above, a power-feeding objective unit such as an electronic unit may incorporate a component that provides notification to the outside as to a state of the power-feeding objective unit (for example, a component based on a technique of notifying the unit state in accordance with a lighting state of a light emitting device). In such a case, it is required to securely notify a user of a current unit state (required to prevent a user from erroneously determining a unit state, etc.) to improve user convenience.

It is therefore desirable to provide an electronic unit and a power feeding system capable of improving user convenience during power transmission (electricity transmission) using one of a magnetic field and an electric field.

According to an embodiment of the present disclosure, there is provided an electronic unit, including: an electricity reception section configured to receive power transmitted using one of a magnetic field and an electric field; a secondary battery configured to be charged based on a received power received by the electricity reception section; and a state notification section configured to provide notification to outside as to a state of its own unit. A charging period during which the secondary battery is charged based on the received power and a non-charging period are set in a time-divisional manner. The state notification section notifies of the unit state based on the received power in both of the charging period and the non-charging period.

According to an embodiment of the present disclosure, there is provided a power feeding system, including: one or more electronic units (power-feeding objective units) according to the above-described embodiment of the present disclosure; and a power feeding unit configured to transmit power to the one or more units using one of a magnetic field and an electric field.

In the electronic unit and the power feeding system according to the embodiments of the present disclosure, notification is made to the outside as to a unit state based on the received power received by the electricity reception section in each of the charging period during which the secondary battery is charged based on the received power, and the non-charging period. Consequently, it is avoided that notification operation is stopped due to lack of received power during a non-power-feeding period. It is therefore avoided that an unnatural discontinuous state in notification operation (intermittent notification operation) occurs between the charging period and the non-charging period that are set in a time-divisional manner, and a user is thus prevented from erroneously determining a unit state.

According to the electronic unit and the power feeding system in the embodiments of the present disclosure, notification is made to the outside as to the unit state based on the received power received by the electricity reception section in each of the charging period during which the secondary battery is charged based on the received power, and the non-charging period. As a result, it is possible to avoid occurrence of an unnatural discontinuous state in notification operation, and prevent a user from erroneously determining a unit state. Consequently, user convenience is allowed to be improved during power transmission using one of a magnetic field and an electric field.

DESCRIPTION OF EMBODIMENT

Hereinafter, an embodiment of the present disclosure is described in detail with reference to the accompanying drawings. It is to be noted that description is made in the following order.
1. Embodiment (an example of notifying a unit state using part of charging power in a non-charging period).
2. Modifications (an example of notifying of a unit state directly using part of received power in a non-charging period, an example of performing power transmission in a noncontact manner using an electric field, and the like).

Embodiment

Overall Configuration of Power Feeding System 4

Figure 1:
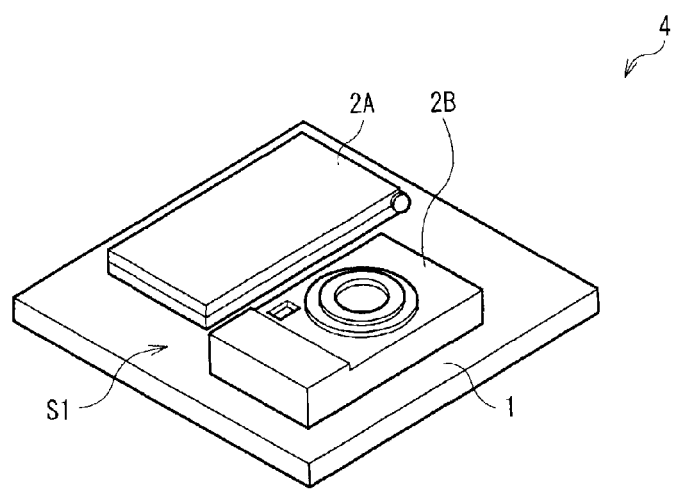
FIG. 1 is a perspective diagram illustrating an exemplary appearance configuration of a power feeding system according to one embodiment of the present disclosure.
Figure 2:
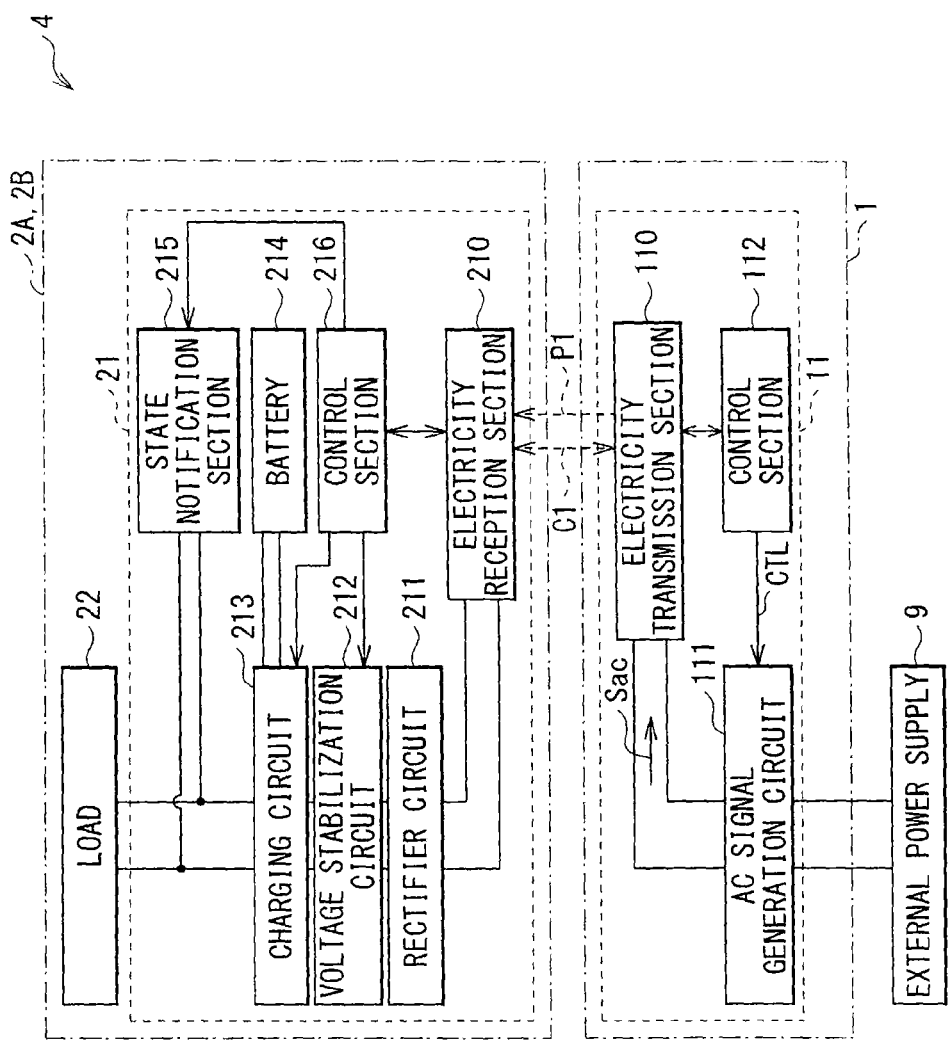
FIG. 2 is a block diagram illustrating an exemplary detailed configuration of the power feeding system illustrated in FIG. 1.

FIG. 1 illustrates an exemplary appearance configuration of a power feeding system (power feeding system 4) according to an example embodiment of the present disclosure. FIG. 2 illustrates an exemplary block configuration of the power feeding system 4. The power feeding system 4 is a system (noncontact power feeding system) that performs power transmission (power supply, power feeding, or electricity transmission) in a noncontact manner using a magnetic field (using magnetic resonance, electromagnetic induction, or the like; the same holds true hereinafter). The power feeding system 4 includes a power feeding unit 1 (primary unit) and one or more electronic units (in this exemplary case, two electronic units 2A and 2B, or secondary units) as power-feeding objective units.

In the power feeding system 4, for example, as illustrated in FIG. 1, the electronic units 2A and 2B are placed on (or disposed close to) a power feeding surface (an electricity transmission surface) S1 of the power feeding unit 1, thereby power transmission is performed from the power feeding unit 1 to the electronic unit 2A or 2B. In this exemplary case, in consideration of a case where power transmission is performed to the plurality of electronic units 2A and 2B in a simultaneous or time-divisional (sequential) manner, the power feeding unit 1 is in a mat shape (tray shape), in which area of the power feeding surface S1 is larger than total area of the electronic units 2A and 2B as a power feeding object.
(Power Feeding Unit 1)

As described above, the power feeding unit 1 is a unit (charging tray) configured to perform power transmission (electricity transmission) to the electronic unit 2A or 2B using a magnetic field. For example, as illustrated in FIG. 2, the power feeding unit 1 includes an electricity transmission unit 11 including an electricity transmission section 110, an AC signal generation circuit (a high-frequency power generation circuit) 111, and a control section 112.

The electricity transmission section 110 includes an electricity transmission coil (a primary coil) L1, capacitors C1p and C1s (resonance capacitors), etc. as described later. The electricity transmission section 110 uses such an electricity transmission coil L1 and capacitors C1p and C1s to perform power transmission (electricity transmission) to the electronic unit 2A or 2B (in detail, an electricity reception section 210 described later) using an AC magnetic field (see an arrow P1 in FIG. 2). Specifically, the electricity transmission section 110 has a function of radiating a magnetic field (magnetic flux) from the power feeding surface S1 to the electronic unit 2A or 2B. The electricity transmission section 110 further has a function of performing predetermined intercommunication operation with the electricity reception section 210 described later (see an arrow C1 in FIG. 2).

For example, the AC signal generation circuit 111 is a circuit configured to generate a predetermined AC signal Sac (high-frequency power) for performing electricity transmission using power supplied from an external power supply 9 (a parent power supply) of the power feeding unit 1. For example, such an AC signal generation circuit 111 is configured of a switching amplifier described later. Examples of the external power supply 9 include a power supply (power supply capacity: 500 mA, source voltage: about 5 V) of USB (Universal Serial Bus) 2.0 provided in PC (Personal Computer).

The control section 112 is configured to perform various types of control operation of the power feeding unit 1 as a whole (the power feeding system 4 as a whole). Specifically, the control section 112 has a function of controlling electricity transmission by the electricity transmission section 110, and further has, for example, a function of performing optimization control of power to be fed, a function of authenticating the secondary units, a function of determining that the secondary units are located on the primary unit, and a function of detecting contamination of a dissimilar metal, etc. In the above-described control of electricity transmission, the control section 112 uses a predetermined control signal CTL (a control signal for electricity transmission) described later to control operation of the AC signal generation circuit 111. The control section 112 further has a function of performing modulation processing with pulse width modulation (PWM) described later using the control signal CTL.
(Electronic Units 2A and 2B)

For example, the electronic units 2A and 2B are each a standalone electronic unit typified by a television receiver, a portable electronic unit having a rechargeable battery (a battery) typified by a mobile phone and a digital camera. For example, as illustrated in FIG. 2, the electronic units 2A and 2B each include an electricity reception unit 21, and a load 22 that performs predetermined operation, the operation allowing the electronic units to exhibit their functions, based on the power supplied from the electricity reception unit 21. The electricity reception unit 21 includes the electricity reception section 210, a rectifier circuit 211, a voltage stabilization circuit 212, a charging circuit 213 (a charging section), a battery 214 (a secondary battery), a state notification section 215, and a control section 216.

The electricity reception section 210 includes an electricity reception coil (secondary coil) L2, capacitors C2p and C2s (resonance capacitors), etc., as described later. The electricity reception section 210 has a function of receiving power transmitted (sent) from the electricity transmission section 110 in the power feeding unit 1 using the electricity reception coil L2, the capacitors C2p and C2s, etc. The electricity reception section 210 further has the above-described function of performing predetermined intercommunication operation with the electricity transmission section 110 (see the arrow C1 in FIG. 2).

The rectifier circuit 211 is a circuit configured to rectify the power (AC power) supplied from the electricity reception section 210 to generate DC power.

The voltage stabilization circuit 212 is a circuit configured to perform predetermined voltage stabilization operation based on the DC power supplied from the rectifier circuit 211.

The charging circuit 213 is a circuit configured to charge the battery 214 based on the DC power subjected to voltage stabilization supplied from the voltage stabilization circuit 212.

The battery 214 stores power in correspondence to charging by the charging circuit 213, and is configured of, for example, a rechargeable battery (secondary battery) such as a lithium ion battery.

The state notification section 215 is configured to provide notification (notice, presentation) to the outside (such as a user) as to a state of its own unit (in this exemplary case, the electronic unit 2A or 2B). Specifically, the state notification section 215 has a function of notifying the outside of such a unit state using, for example, a lighting state (display state) of a light emitting device described later, or sound output with a speaker, etc. In this exemplary case, the state notification section 215 separately notifies of states, the states being a state during charging of the battery 214 by the charging circuit 213 and a state after completion of the charging, as the unit states, and an unusual state of the battery 214. It is to be noted that a detailed configuration of the state notification section 215 is described later (FIG. 3).

The control section 216 is configured to perform various types of control operation of the electronic units 2A and 2B as a whole (the power feeding system 4 as a whole). Specifically, the control section 216 has a function of controlling electricity reception by the electricity reception section 110, a function of controlling communication, and a function of controlling operation of each of the voltage stabilization circuit 212, the charging circuit 213, and the state notification section 215.

[Detailed Configuration of Each of Power Feeding Unit 1 and Electronic Units 2A and 2B]

Figure 3:
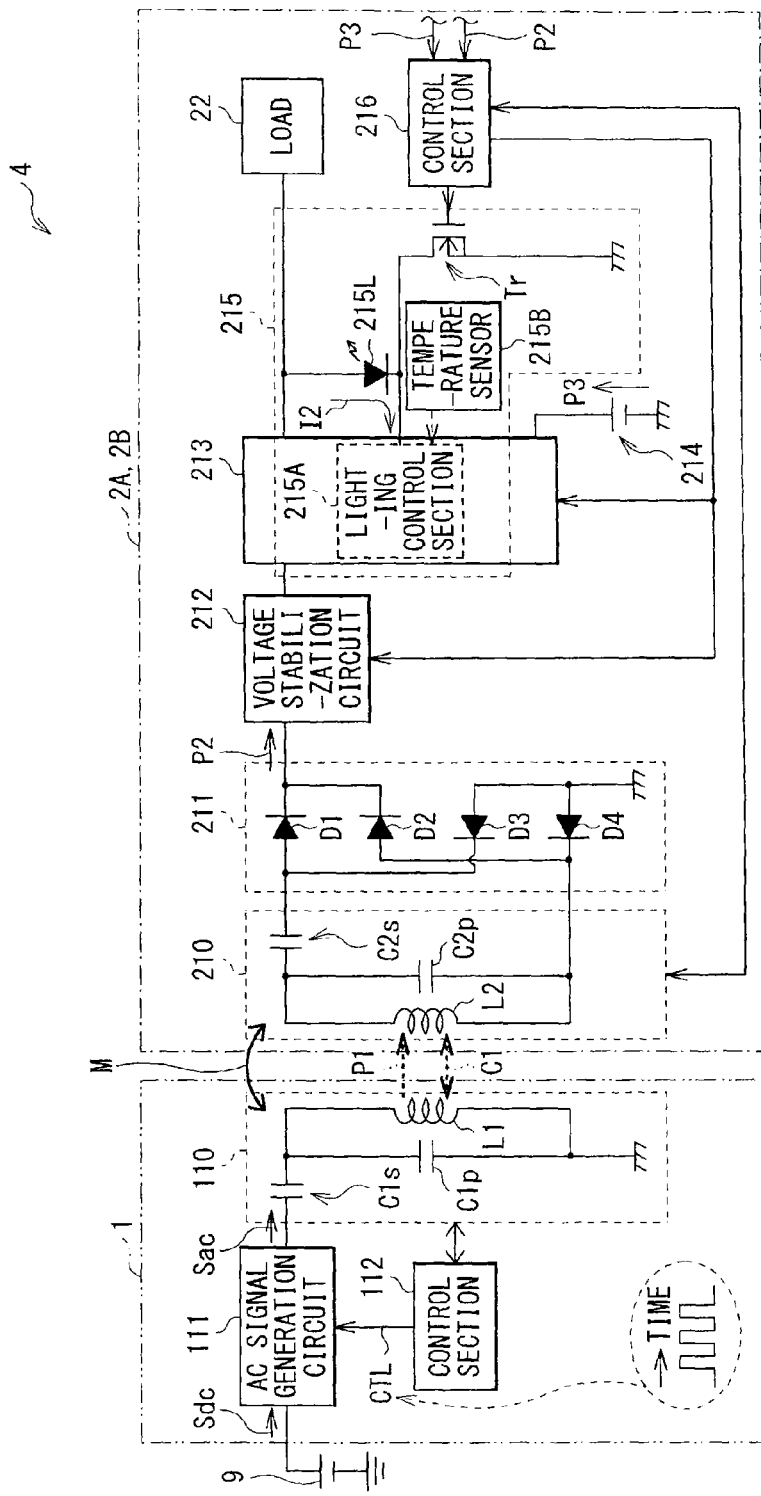
FIG. 3 is a circuit diagram illustrating an exemplary detailed configuration of each of blocks illustrated in FIG. 2.

FIG. 3 is a circuit diagram illustrating an exemplary detailed configuration of each of blocks in the power feeding unit 1 and in electronic units 2A and 2B illustrated in FIG. 2.

(Electricity Transmission Section 110)

The electricity transmission section 110 includes the electricity transmission coil L1 for performing power transmission using a magnetic field (for generating magnetic flux), and the capacitors C1p and C1s for forming an LC resonance circuit together with the electricity transmission coil L1. The capacitors C1s is electrically connected in series to the electricity transmission coil L1. Specifically, a first end of the capacitor C1s is connected to a first end of the electricity transmission coil L1. A second end of the capacitor C1s and a second end of the electricity transmission coil L1 are connected in parallel to the capacitor C1p, and a connection end between the electricity transmission coil L1 and the capacitor C1p is grounded.

The LC resonance circuit configured of the electricity transmission coil L1 and the capacitors C1p and C1s is magnetically coupled with an LC resonance circuit configured of a electricity reception coil L2 and capacitors C2p and C2s described later. Consequently, LC resonance operation is performed at a resonance frequency substantially equal to a frequency of high-frequency power (an AC signal Sac) generated by the AC signal generation circuit 111 described later.

(AC Signal Generation Circuit 111)

Figure 4:
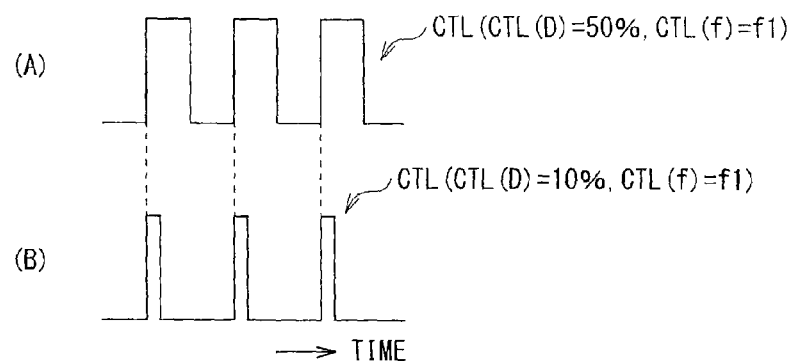
FIG. 4 includes timing waveform diagrams illustrating an exemplary control signal for an AC signal generation circuit.

The AC signal generation circuit 111 is configured of a switching amplifier (so-called a class E amplifier) having one transistor (not shown) as a switching element. The AC signal generation circuit 111 is configured to receive a control signal CTL for electricity transmission from the control section 112. As illustrated in FIG. 3, the control signal CTL is a pulse signal having a predetermined duty ratio. For example, as illustrated in FIGS. 4(A) and 4(B), pulse width modulation described later is performed through control of the duty ratio of the control signal CTL.

According to such a configuration, the AC signal generation circuit 111 performs ON/OFF operation (switching operation at a predetermined frequency and with a predetermined duty ratio) in accordance with the control signal CTL for electricity transmission. Specifically, ON/OFF operation of the transistor as the switching element is controlled using the control signal CTL supplied from the control section 112. Consequently, for example, the AC signal Sac (AC power) is generated based on a DC signal Sdc received from the external power supply 9, and is supplied to the electricity transmission section 10.

(Electricity Reception Section 210)

The electricity reception section 210 includes an electricity reception coil L2 for receiving power (from the magnetic flux) transmitted from the electricity transmission section 110, and capacitors C2p and C2s for forming an LC resonance circuit together with the electricity reception coil L2. The capacitor C2p is electrically connected in parallel to the electricity reception coil L2, while the capacitor C2s is electrically connected in series to the electricity reception coil L2. Specifically, a first end of the capacitor C2s is connected to a first end of the capacitor C2p and to a first end of the electricity reception coil L2. A second end of the capacitor C2s is connected to a first input terminal of the rectifier circuit 211, a second end of the electricity reception coil L2 and a second end of the capacitor C2p are each connected to a second input terminal of the rectifier circuit 211.

The LC resonance circuit configured of the electricity reception coil L2 and the capacitors C2p and C2s is magnetically coupled with the LC resonance circuit configured of the electricity transmission coil L1 and the capacitors C1p and C1s described above. Consequently, LC resonance operation is performed at a resonance frequency that is substantially equal to a frequency of the high-frequency power (AC signal Sac) generated by the AC signal generation circuit 111.

(Rectifier Circuit 211)

In this exemplary case, the rectifier circuit 211 is configured of four rectifier elements (diodes) D1 to D4. Specifically, an anode of the rectifier element D1 and a cathode of the rectifier element D3 are each connected to the first input terminal of the rectifier circuit 211. A cathode of the rectifier element D1 and a cathode of the rectifier element D2 are each connected to an output terminal of the rectifier circuit 211. An anode of the rectifier element D2 and a cathode of the rectifier element D4 are each connected to the second input terminal of the rectifier circuit 211. An anode of the rectifier element D3 and an anode of the rectifier element D4 are each grounded. According to such a configuration, the rectifier circuit 211 rectifies the AC power supplied from the electricity reception section 210, and supplies received power P2 as the DC power to the voltage stabilization circuit 212.

(Charging Circuit 213)

The charging circuit 213 charges the battery 214 as described above based on the DC power (received power P2) subjected to voltage stabilization. In this exemplary case, the charging circuit 213 also incorporates a lighting control section 215A in the state notification section 215 described below. It is to be noted that the lighting control section 215A is configured of, for example, a microcomputer or the like.

(State Notification Section 215)

The state notification section 215 also provides notification to the outside as to the above-described unit state, based on the DC power (received power P2) subjected to voltage stabilization (directly or indirectly using the received power P2). As illustrated in FIG. 3, the state notification section 215 includes a light emitting device (lighting section) 215L configured of a light emitting diode (LED) or the like, the above-described lighting control section 215A, a temperature sensor 215B (state detection section), and a transistor Tr as a switching element. In this exemplary case, the transistor Tr is configured of an n-type FET (Field Effective Transistor).

The light emitting device 215L is a device that serves to notify of the unit state (each of the state during the charging, the state after completion of the charging, and the unusual state) depending on a lighting state (for example, each of a lit state, an unlit state, and a flashing state). In this exemplary case, the light emitting device 215L is configured such that its anode is connected to a connection line between the charging circuit 213 and a load 22, a cathode is connected to a terminal of the lighting control section 215A, and cathode potential is controlled by the lighting control section 215A.

The temperature sensor 215B is a device for detecting an unusual state (for example, an unusual state due to heating or the like) of the battery 214 by temperature. A detection result (a detection result such as presence of an unusual state of the battery 214 in correspondence to a value of the temperature) of the temperature sensor 215B is supplied to the lighting control section 215A.

In this exemplary case, the lighting control section 215A controls a lighting state (performs lighting control) of the light emitting device 215L through control of cathode potential of the light emitting device 215L, based on the detection result such as presence of the unusual state of the battery 214 supplied from the temperature sensor 215B. Specifically, for example, the lighting control section 215A sets the cathode potential of the light emitting device 215L to ground potential (earth potential) to allow a current I2 illustrated in FIG. 3 to flow through the light emitting device 215L so that the light emitting device 215L is lit. In addition, the lighting control section 215A sets the cathode potential to a potential other than the ground potential to prevent the current I2 from flowing so that the light emitting device 215L is unlit. The lighting control section 215A also performs such operation (lighting control) using the DC power (received power P2) subjected to voltage stabilization.

In this embodiment, the state notification section 215 performs state notification operation in the following manner. Specifically, the state notification section 215 notifies of the unit state, based on the received power P2 received by the electricity reception section 21 in both of a power feeding period Tp (a charging period of the battery 214 based on the received power P2) and a communication period Tc (non-charging period) described later. Specifically, in the power feeding period Tp (charging period), the state notification section 215 notifies of the unit state directly using the received power P2 received during the charging period. On the other hand, in the non-charging period (in this exemplary case, the communication period Tc described later), the state notification section 215 notifies of the unit state indirectly using the received power P2 received during the charging period (in this exemplary case, using part of charging power P3 stored in the battery 214 based on the received power P2, see FIG. 3). In detail, while the lighting control section 215A controls the lighting state of the light emitting device 215L using the received power P2 in the power feeding period Tp (charging period), the control section 216 controls the lighting state using part of the charging power P3 in the non-charging period (the communication period Tc in this exemplary case). It is to be noted that more specific operation of such state notification operation and of lighting control is described later.

Functions and Effects of Power Feeding System 4

1. Summary of Overall Operation

In the power feeding system 4, the AC signal generation circuit 111 in the power feeding unit 1 supplies the predetermined high-frequency power (the AC signal Sac) for power transmission to the electricity transmission coil L1 and the capacitors C1p and C1s (the LC resonance circuit) in the electricity transmission section 110, based on the power supplied from the external power supply 9. Consequently, the electricity transmission coil L1 in the electricity transmission section 110 generates a magnetic field (magnetic flux). At this time, when the electronic units 2A and 2B as power-feeding objective units (charging objective units) are placed on (or disposed close to) a top (the power feeding surface S1) of the power feeding unit 1, the electricity transmission coil L1 in the power feeding unit 1 becomes proximate to the electricity reception coil L2 in the electronic unit 2A or 2B in the vicinity of the power feeding surface S1.

In this way, when the electricity reception coil L2 is disposed close to the electricity transmission coil L1 generating a magnetic field (magnetic flux), electromotive force is induced in the electricity reception coil L2 by the magnetic flux generated from the electricity transmission coil L1. In other words, the magnetic field is generated by electromagnetic induction or magnetic resonance while interlinking with each of the electricity transmission coil L1 and the electricity reception coil L2. Consequently, power is transmitted from an electricity transmission coil L1 side (the primary side, a power feeding unit 1 side, or an electricity transmission section 110 side) to an electricity reception coil L2 side (the secondary side, an electronic units 2A and 2B side, or an electricity reception section 210 side) (see the arrow P1 in FIGS. 2 and 3). At this time, the electricity transmission coil L1 in the power feeding unit 1 is magnetically coupled with the electricity reception coil L2 in the electronic unit 2A or 2B, so that the LC resonance circuit performs LC resonance operation.

In the electronic unit 2A or 2B, the AC power received by the electricity reception coil L2 is therefore supplied to the rectifier circuit 211, the voltage stabilization circuit 212, and the charging circuit 213, and the following charging operation is performed. Specifically, the AC power is converted into a predetermined DC voltage by the rectifier circuit 211, and the DC voltage is voltage-stabilized by the voltage stabilization circuit 212, and then the charging circuit 213 charges the battery 214 based on the DC voltage. In this way, the electronic unit 2A or 2B perform charging operation based on the power received by the electricity reception section 210.

In other words, in this embodiment, for example, terminal connection to an AC adaptor or the like is not necessary for charging of the electronic unit 2A or 2B, and thus charging is allowed to be easily started (noncontact power feeding is performed) only by placing the electronic units 2A and 2B on (or disposing the electronic units 2A and 2B close to) the power feeding surface S1 of the power feeding unit 1. This leads to reduced burden of a user.

Figure 5:
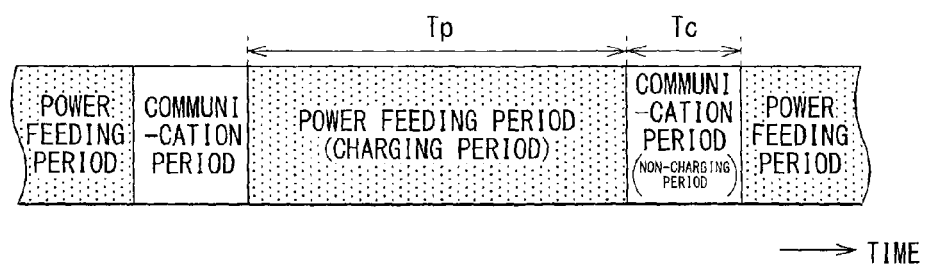
FIG. 5 is a timing diagram illustrating an example of each of a power feeding period and a communication period.

For example, as illustrated in FIG. 5, in such power feeding operation, the power feeding period Tp (the charging period of the battery 214) and the communication period Tc (non-charging period) are periodically (or non-periodically) provided in a time-divisional manner. In other words, the control sections 112 and 216 control the power feeding period Tp and the communication period Tc to be periodically (or non-periodically) set in a time-divisional manner. The communication period Tc is a period during which intercommunication operation using the electricity transmission coil L1 and the electricity reception coil L2 (intercommunication operation for authentication of respective units, control of power feeding efficiency, and the like) is performed between the primary unit (power feeding unit 1) and the secondary unit (electronic unit 2A or 2B) (see the arrow C1 in FIGS. 2 and 3). In this exemplary case, a time ratio of the power feeding period Tp to the communication period Tc is, for example, power feeding period Tp/communication period Tc=about 9/1.

In the communication period Tc, for example, communication operation is performed with pulse width modulation defined by the AC signal generation circuit 111. Specifically, communication is performed with the pulse width modulation through setting of a duty ratio of the control signal CTL in the communication period Tc based on predetermined modulation data. It is in principle difficult to perform frequency modulation during the above-described resonance operation of the electricity transmission section 110 and the electricity reception section 210. Communication operation is therefore easily achieved using such pulse width modulation.

2. State Notification Operation

In the power feeding system 4 of this embodiment, the electronic unit 2A or 2B incorporates means (the state notification section 215) that provides notification to the outside as to a state of the electronic unit 2A or 2B. The state notification section 215 provides notification to the outside as to such a unit state, based on the received power P2 received from the power feeding unit 1 (directly or indirectly using the received power P2).

Specifically, in this exemplary case, the state notification section 215 separately notifies of the states, the state being the state during charging of the battery 214 by the charging circuit 213 and the state after completion of the charging, and the unusual state of the battery 214, in accordance with a lighting state (the lit state, the unlit state, and the flashing state) of the light emitting device 215L. Specifically, for example, the lighting control section 215A in the state notification section 215 controls the light emitting device 215L to be lit during the charging, controls the light emitting device 215L to be unlit after completion of the charging, and controls the light emitting device 215L to be flashed in the unusual state.

The electronic unit 2A or 2B is allowed to notify a user or the like of a current unit state through such state notification operation performed by the state notification section 215, leading to improvement in convenience of a user or the like. The state notification operation in this embodiment is now described in detail in comparison with a comparative example.

2-1. Comparative Example

Figure 6:
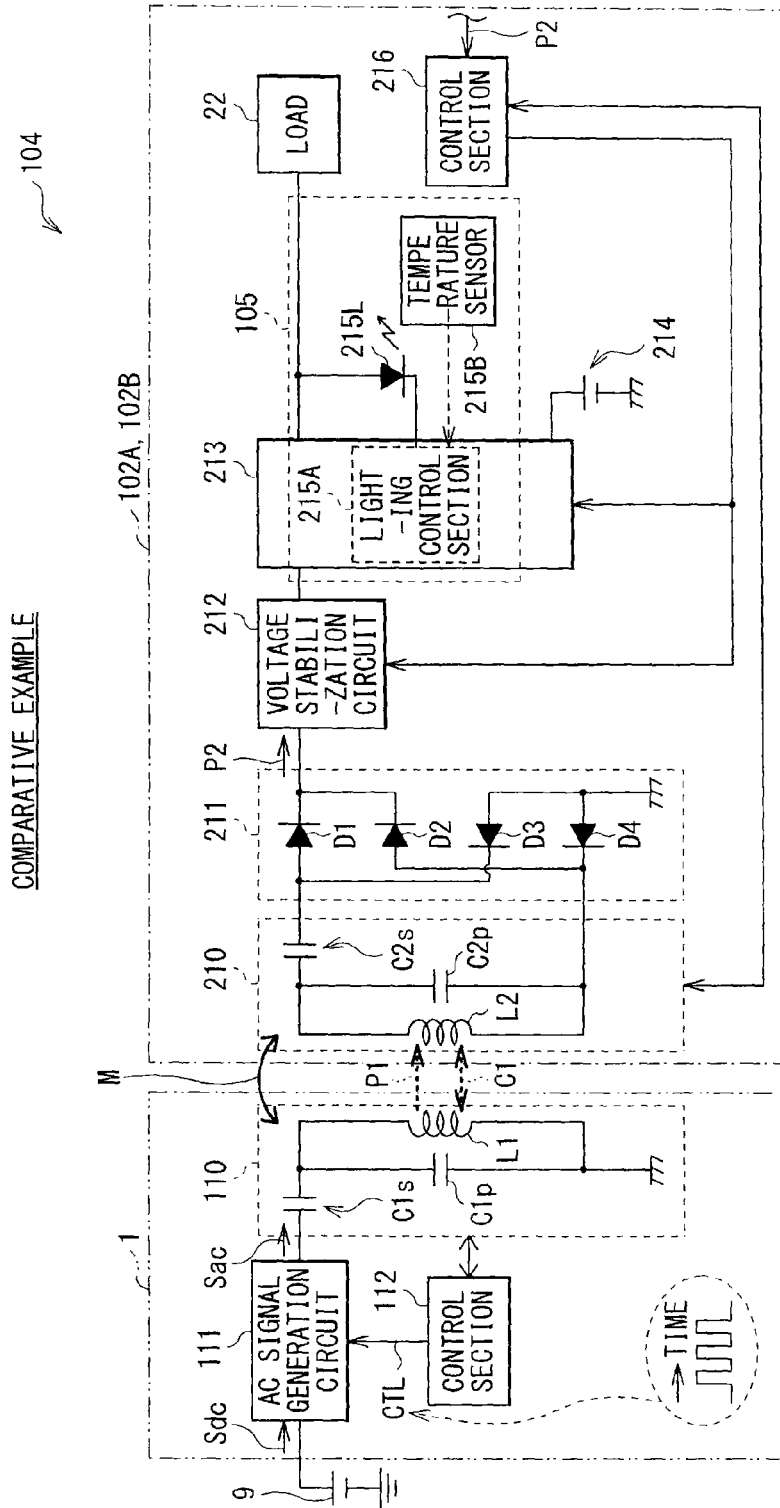
FIG. 6 is a circuit diagram illustrating a configuration of a power feeding system according to a comparative example.

FIG. 6 is a circuit diagram illustrating a configuration of a power feeding system (power feeding system 104) according to a comparative example. The power feeding system 104 of the comparative example includes a power feeding unit 1 and electronic units 102A and 102B according to the comparative example. The electronic unit 102A or 102B according to the comparative example is a modification of the electronic unit 2A or 2B according to the above-described embodiment, in which a state notification section 105 is provided in place of the state notification section 215 while being different from the state notification section 215 in that the transistor Tr is omitted (is not provided). In the electronic unit 102A or 102B according to the comparative example, therefore, the control section 216 does not perform lighting control unlike the electronic unit 2A or 2B of this embodiment as described later.

Figure 7:
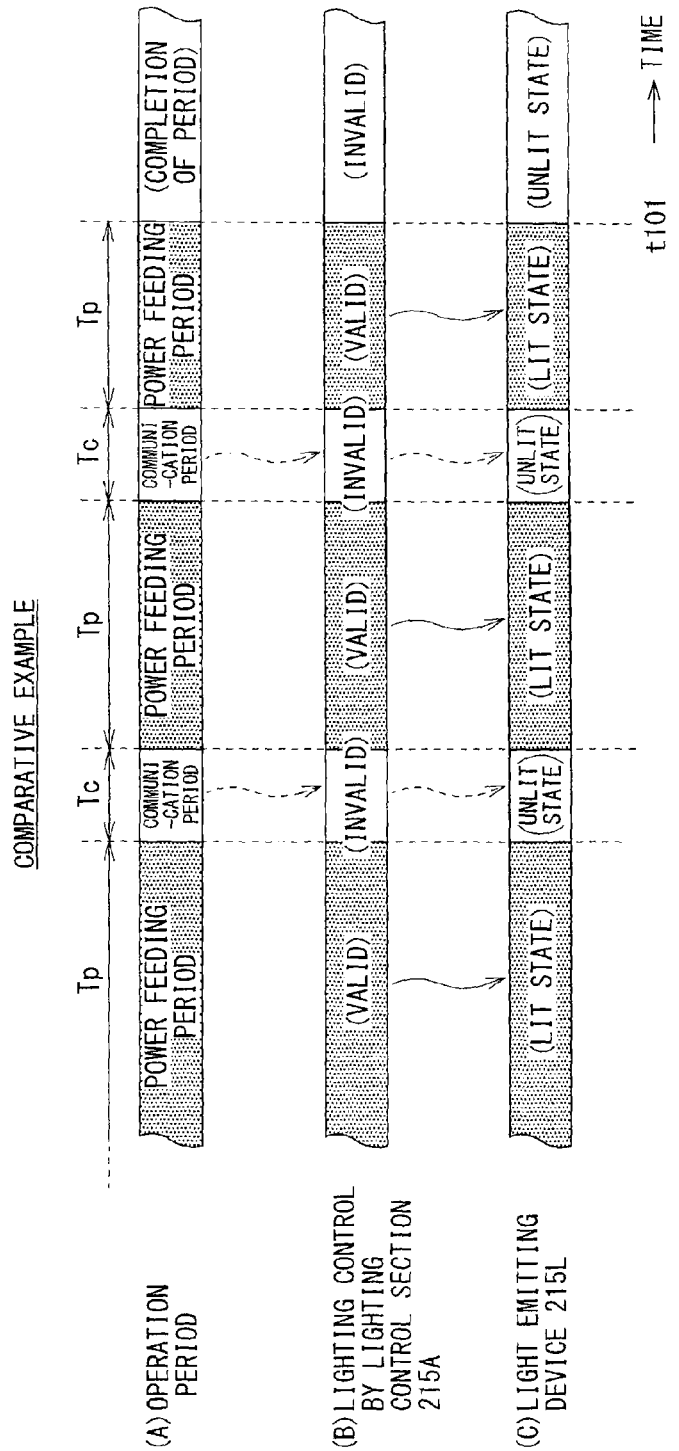
FIG. 7 is a timing diagram illustrating an exemplary operation of the power feeding system illustrated in FIG. 6.

FIG. 7 is a timing diagram illustrating an exemplary operation of the power feeding system 104 according to the comparative example illustrated in FIG. 6. In FIG. 7, (A) illustrates an operation period of the power feeding system 104, (B) illustrates an operation state during lighting control by the charging circuit 213, and (C) illustrates an operation state of the light emitting device 215L.

In this exemplary operation, the power feeding period Tp and the communication period Tc are periodically (alternately) repeated in a time-divisional manner in a period up to timing t101, and charging operation is completed (electricity reception is completed) at timing t101.

In the power feeding period Tp (charging period), the charging circuit 213 performs charging operation of the battery 214 using charging power P2 received during such a period. As illustrated in solid arrows in FIGS. 6 and 7, the lighting control section 215A incorporated in the charging circuit 213 also performs lighting control using the charging power P2 such that the light emitting device 215L is lit, thereby notification that the battery 214 is being charged is made to the outside. In other words, in the power feeding period Tp (charging period), since the received power P2 is supplied to the charging circuit 213, operation of the charging circuit 213 and operation of the lighting control section 215A incorporated therein are enabled (lighting control by the lighting control section 215A becomes valid).

In the period after timing t101 at which the charging is completed, power transmission (electricity transmission) operation from the electricity transmission unit 11 to the electronic unit 102A or 102B is stopped. In the period after completion of the charging, therefore, the light emitting device 215L is unlit as illustrated in (C) of FIG. 7, and notification that the battery 214 has been charged is made to the outside.

Figure 8:
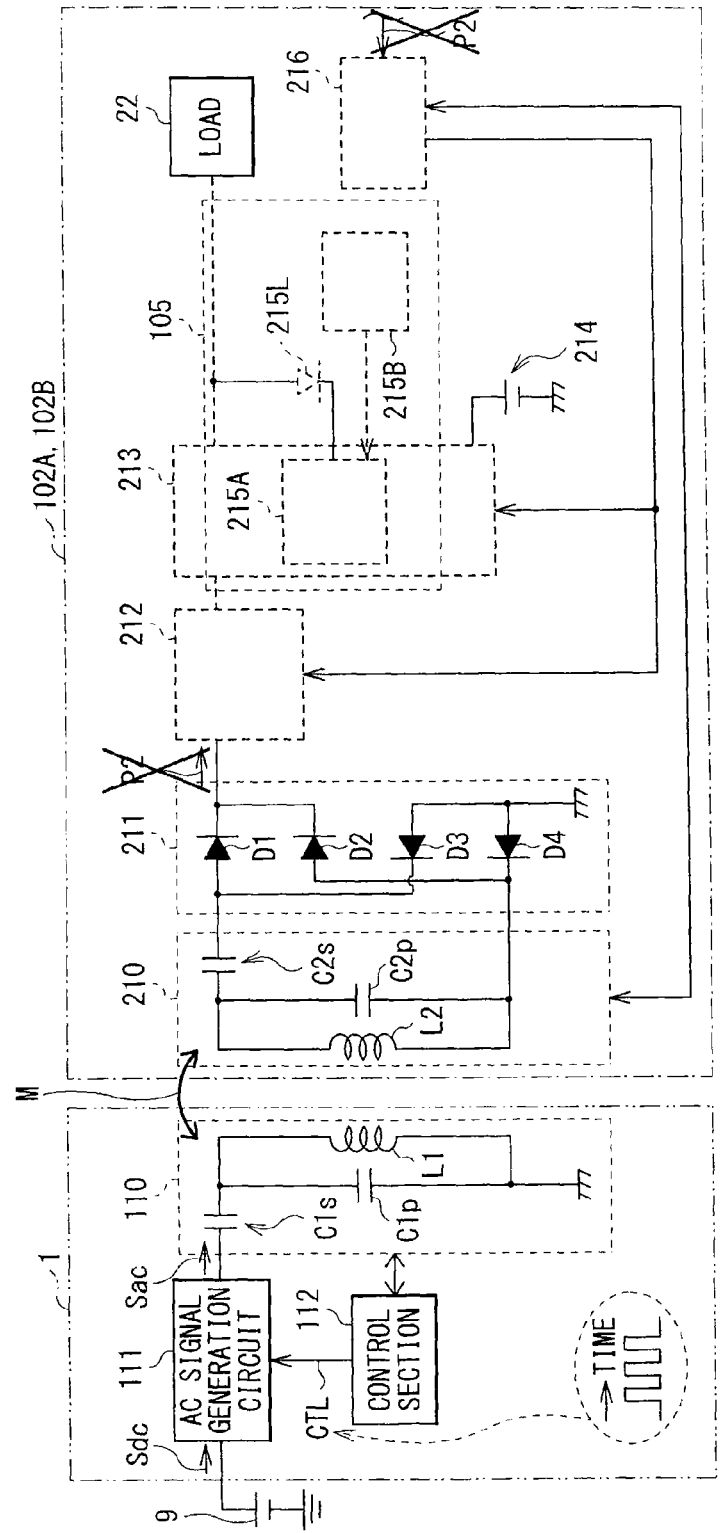
FIG. 8 is a circuit diagram illustrating an exemplary operation during a communication period of the power feeding system illustrated in FIG. 6.

On the other hand, in the communication period Tc (non-charging period), for example, as illustrated in FIG. 8, the charging circuit 213, the state notification section 105, and the load 22 located in a downstream of them are disconnected from the electricity reception section 210, and thus supply of the received power P2 is stopped to any of them. At this time, supply of the received power P2 is also stopped to the control section 216. Such loads (the charging circuit 213, the state notification section 105, and the load 22) are disconnected in the communication period Tc for the following reason. Specifically, such capacitive loads are disconnected to be in a relatively light load state, so that an interfering factor of communication operation is eliminated to secure excellent communication operation.

In this way, in the communication period Tc (non-charging period), supply of the received power P2 is stopped to each of the charging circuit 213, the state notification section 105, and the control section 216. Hence, for example, as illustrated by broken-line arrows in FIG. 7, lighting control by the lighting control section 215A becomes invalid. Specifically, state notification operation is stopped due to lack of the received power P2. As a result, an unnatural discontinuous state in notification operation (intermittent notification operation) may occur between the power feeding period Tp (charging period) and a non-power-feeding period Tc (non-charging period) that are (periodically) set in a time-divisional manner, so that a user may erroneously determine the unit state. Specifically, for example, if the light emitting device 215L is unlit once in every several tens of seconds, the light emitting device 215L appears to a user as flashing despite the charging period. This may cause misunderstanding that, for example, an unusual state of the battery 214 or the like occurs in the electronic unit 2A or 2B. Thus, user convenience is reduced in the power feeding system 104 of the comparative example.

2-2 This Embodiment

In contrast, the power feeding system 4 of this embodiment solves the issue of the above-described comparative example in the following manner.

Figure 9:
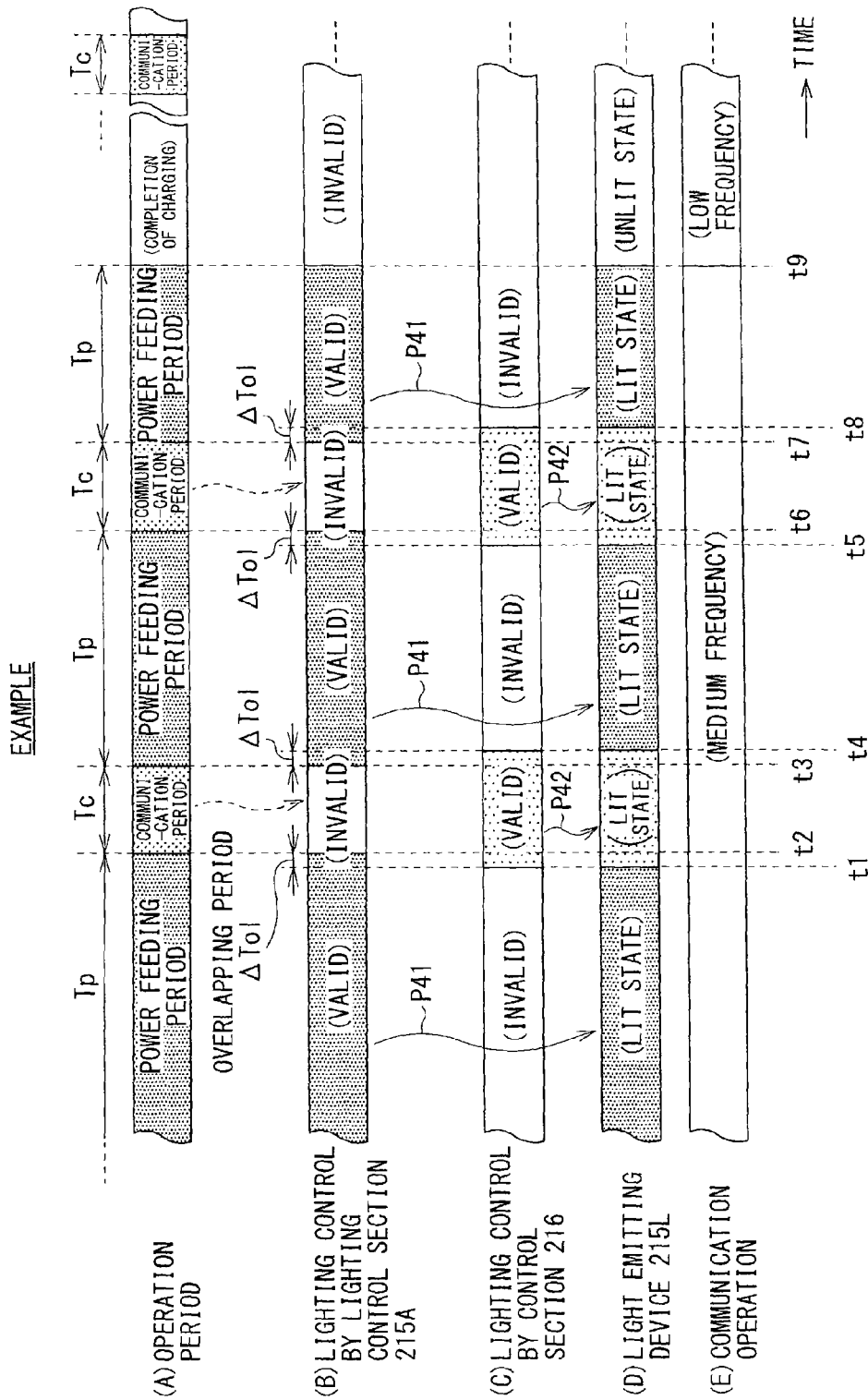
FIG. 9 is a timing diagram illustrating an exemplary operation (operation example) of the power feeding system illustrated in FIG. 3.

FIG. 9 is a timing diagram illustrating an exemplary operation of the power feeding system 4 of this embodiment. In FIG. 9, (A) illustrates an operation period of the power feeding system 4, (B) illustrates an operation state during lighting control by the charging circuit 213, (C) illustrates an operation state during lighting control by the control section 216, (D) illustrates an operation state of the light emitting device 215L, and (E) illustrates a state of communication operation between the power feeding unit 1 and the electronic unit 2A or 2B.

In the exemplary operation illustrated in FIG. 9, as with the exemplary operation illustrated in FIG. 7, the power feeding period Tp and the communication period Tc are periodically (alternately) repeated in a time-divisional manner in a period up to timing t9, and charging operation is completed (electricity reception is completed) at timing t9.

In the power feeding period Tp (charging period), as with the comparative example, the lighting control section 215A performs lighting control (directly) using the charging power P2 received during this period such that the light emitting device 215L is lit, as illustrated in arrows P41 in FIGS. 3 and 9. Specifically, for example, cathode potential of the light emitting device 215L is set to ground potential (earth potential), thereby the current I2 illustrated in FIG. 3 flows through the light emitting device 215L so that the light emitting device 215L is lit. Consequently, notification that the battery 214 is being charged is made to the outside. In other words, in the power feeding period Tp (charging period), since the received power P2 is supplied to the charging circuit 213, lighting control by the lighting control section 215A becomes valid. It is to be noted that lighting control by the control section 216 described later is basically invalid in the power feeding period Tp (except an overlapping period To1 described alter).

In the period on or after timing t9 at which the charging is completed, power transmission (electricity transmission) operation from the electricity transmission unit 11 to the electronic unit 2A or 2B is stopped as with the comparative example. In the period after completion of the charging, therefore, the light emitting device 215L is unlit as illustrated in (D) of FIG. 9, and notification that the battery 214 has been charged is made to the outside.

Figure 10:
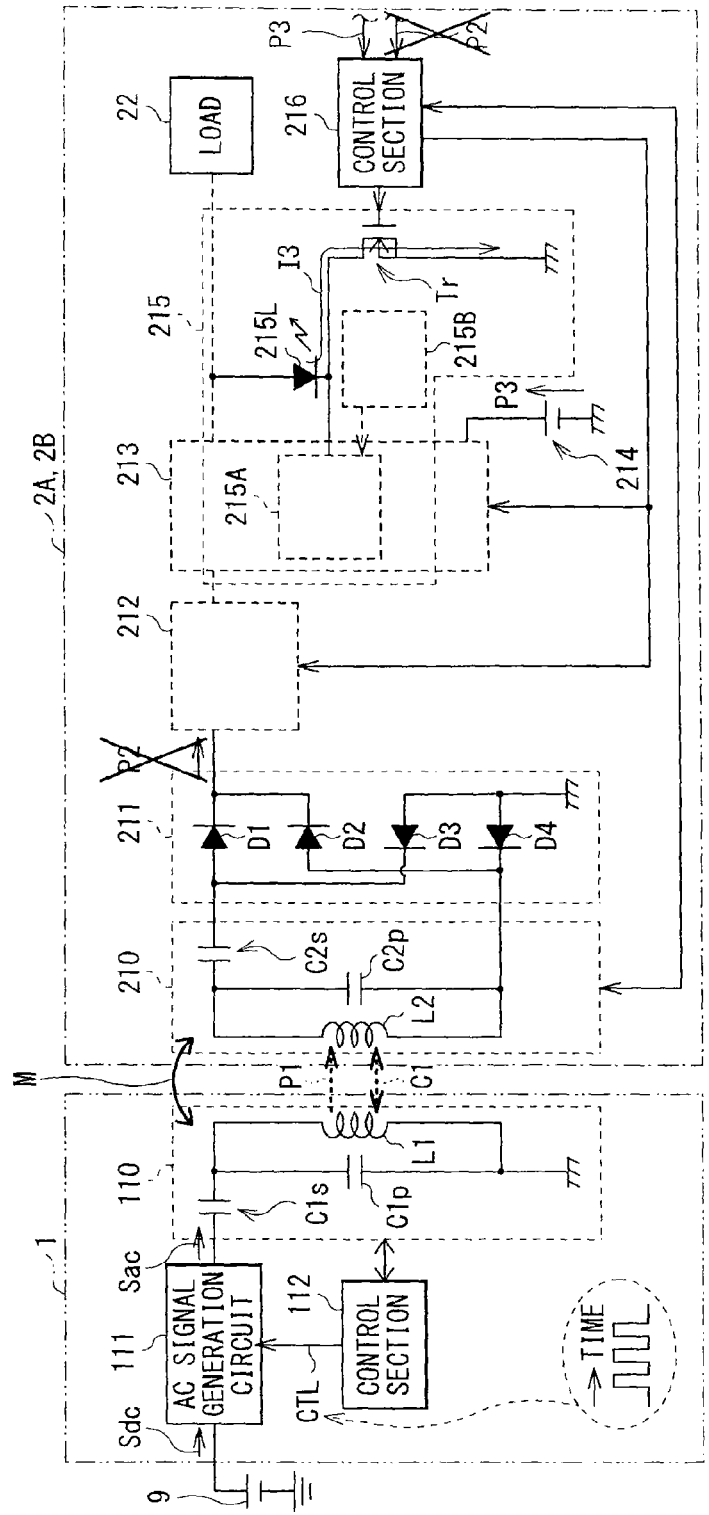
FIG. 10 is a circuit diagram illustrating an exemplary operation (operation example) during a communication period of the power feeding system illustrated in FIG. 3.

On the other hand, in the communication period Tc (non-charging period), for example, operation as illustrated in FIG. 10 is performed in this embodiment unlike in the comparative example. Specifically, in the communication period Tc, notification of the unit state is performed indirectly using the received power P2 received during the power feeding period Tp (charging period) (in this exemplary case, using part of the charging power P3 stored in the battery 214 based on the received power P2). In detail, as illustrated in FIG. 10, the control section 216 controls a lighting state using part of the charging power P3 in the communication period Tc (non-charging period). Specifically, the control section 216 controls gate potential of the transistor Tr in the state notification section 215 such that the transistor Tr is turned on so that a current I3 illustrated in FIG. 10 flows through the light emitting device 215L.

In this way, in the communication period Tc, cathode potential of the light emitting device 215L is not allowed to be controlled by the lighting control section 215A. Instead, the transistor Tr is set to be ON by the control section 216 to perform control of the cathode potential (setting of the cathode potential to ground potential). Specifically, in the communication period Tc, as illustrated by arrows P42 in FIG. 9, lighting control by the lighting control section 215A becomes invalid. Instead, lighting control by the control section 216 becomes valid.

In this way, in the state notification operation of this embodiment, even if supply of the received power P2 is stopped to each of the charging circuit 213, the state notification section 215, and the control section 216 in the communication period Tc for achieving reduction in the load state, etc., the issue in the comparative example is avoided. In other words, stop of the state notification operation caused by lack of the received power P2 is avoided. As a result, an unnatural discontinuous state is avoided in notification operation (intermittent notification operation) between the power feeding period Tp (charging period) and a non-power-feeding period Tc (non-charging period) that are (periodically) set in a time-divisional manner, and a user is prevented from erroneously determining the unit state. Specifically, the light emitting device 215L is prevented from being seen as if it is flashing despite the charging period. This eliminates a possibility of misunderstanding that, for example, an unusual state of the battery 214 or the like occurs in the electronic unit 2A or 2B. In other words, in this embodiment, in a charging period (a period before completion of charging) as illustrated in FIG. 9, the light emitting device 215L is normally lit (is lit without a break) in both the power feeding period Tp and the communication period Tc, and notification informing the charging period is securely made to the outside.

Also, at this time, in this embodiment, for example, as illustrated in FIG. 9, the control section 216 desirably performs control such that the overlapping period To1 with the power feeding period Tp (charging period) is provided in one or both of periods before and after the communication period Tc (non-charging period). Specifically, in this exemplary operation, such an overlapping period To1 (each of periods of timing t1 to timing t2, timing t3 to timing t4, timing t5 to timing t6, and timing t7 to timing t8) is provided in both periods before and after each of the communication periods Tc of timing t2 to timing t3 and timing t6 to timing t7. The control section 216 desirably controls the lighting state using part of the charging power P3 not only in the communication period Tc but also in the overlapping period To1. This is because a surplus lighting period (the overlapping period To1) for more securely preventing occurrence of a period during which the light emitting device 215L is unlit is thereby provided in one or both of periods before and after the communication period Tc.

3. Setting of Communication Operation

In this embodiment, for example, communication operation between the power feeding unit 1 and the electronic unit 2A or 2B is desirably set as illustrated in (E) of FIG. 9. Such setting (control) of communication operation is performed by the control section 112 in the power feeding unit 1 or by the control section 216 in the electronic unit 2A or 2B.

Specifically, first, communication operation (the communication period Tc) is desirably continuously set even after completion of charging of the battery 214 by the charging circuit 213. This is because regularly performing such communication operation after completion of charging allows the power feeding unit 1 and the electronic unit 2A or 2B to mutually recognize their respective operation states in the power feeding system 4 (a state of the power feeding unit 1 and a state of the electronic unit 2A or 2B), and to take appropriate measures according to the recognized operation states.

Also, at this time, as illustrated in (E) of FIG. 9, communication operation (the communication period Tc) is desirably set at a lower frequency in the period after completion of charging than in the charging period. Hence, in this exemplary operation, the communication operation is set at a low frequency in the period after completion of charging while being set at a medium frequency in the charging period. This is because the necessity of frequently grasping the mutual unit states is not so high in the period after completion of charging.

As described above, in this embodiment, in the electronic unit 2A or 2B, notification is made to the outside as to the unit state based on the received power P2 received by the electricity reception section 210, in both of the power feeding period Tp (charging period) during which the battery 214 is charged based on the received power P2 and the communication period Tc (non-charging period). This makes it possible to avoid occurrence of an unnatural discontinuous state in notification operation, and prevent a user from erroneously determining a unit state. Consequently, user convenience is allowed to be improved during power transmission using a magnetic field.

Even if state notification operation (lighting control of the light emitting device 215L) is performed using part of the charging power P3 of the battery 214 in the communication period Tc as described above, used power is unproblematically extremely small as long as the received power P2 is large. It can be said that used power is small and is thus less influential also from the view point that the communication period Tc is a significantly short period when power feeding period Tp/communication period Tc is about 9/1.

Although this embodiment has been described with a case where the non-charging period is the communication period Tc, this is not limitative. The control section 216 may perform lighting control using part of the charging power P3 in a non-charging period other than the communication period Tc.

MODIFICATION

Although the technology according to the present disclosure has been described with an embodiment hereinbefore, the technology is not limited thereto, and various modifications or alterations thereof may be made.

Figure 11:
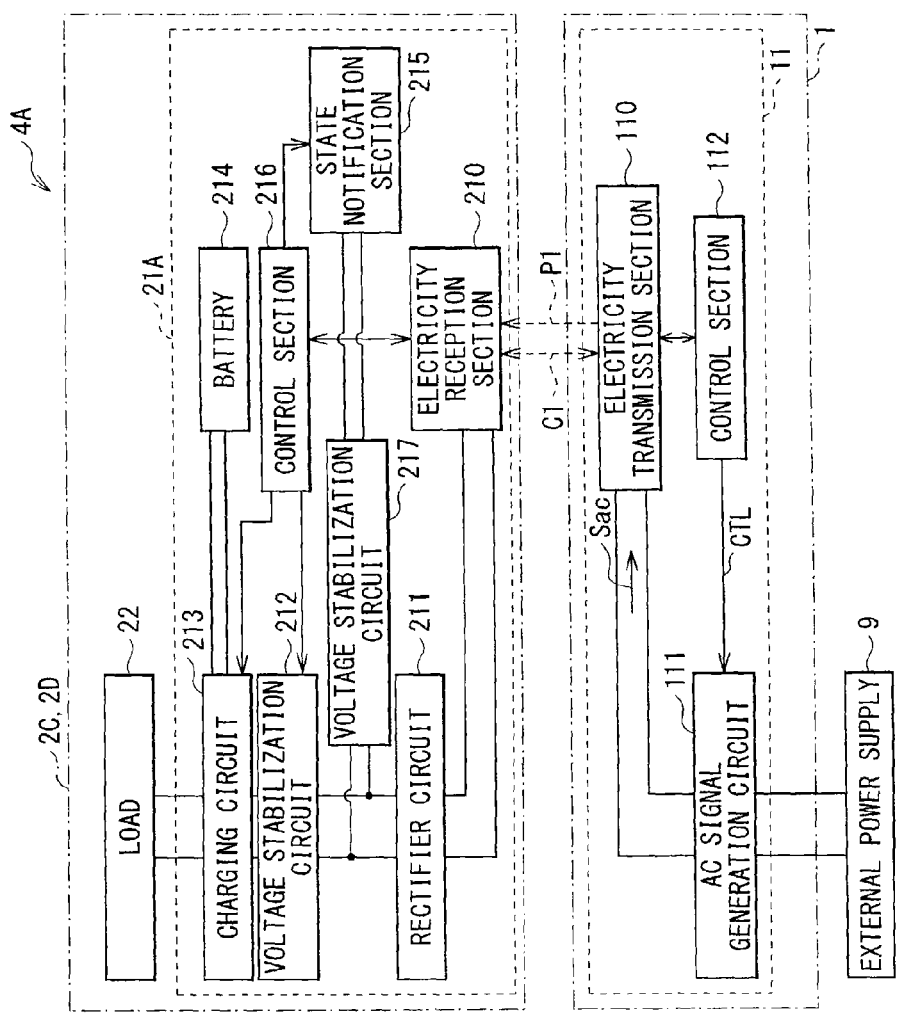
FIG. 11 is a block diagram illustrating an exemplary configuration of a power feeding system according to a modification.

For example, although the above-described embodiment has been described with a case where notification of a unit state is performed indirectly using the received power P2 received during the power feeding period Tp (charging period) (using part of the charging power P3 stored in the battery 214) in the communication period Tc (non-charging period), this is not limitative. Specifically, for example, the state notification section 215 may notify of a unit state directly using part of the received power P2 received during the non-charging period (communication period Tc, etc.), in the non-charging period. In other words, in both of the charging period and the non-charging period, notification of a unit state may be performed directly using the received power P2 during each period. In this case, for example, the state notification section 215 is disposed as in an electricity reception unit 21A in an electric unit 2C or 2D of a power feeding system 4A illustrated in FIG. 11. Specifically, the state notification section 215 may perform notification of a unit state using the received power P2 supplied from a connection line between the rectifier circuit 211 and the voltage stabilization circuit 212 via a separately provided voltage stabilization circuit 217. The power feeding system 4A having such a configuration is also allowed to exhibit effects similar to those in the above-described embodiment.

Also, for example, although the above-described embodiment is described with various coils (the electricity transmission coil and the electricity reception coil), configurations (shapes) of such coils may include any of various types. Specifically, each coil may have, for example, a spiral shape, a loop shape, a bar shape using a magnetic material, an α-round shape including a spiral coil that is disposed in two layers in a folded manner, a spiral shape having more layers, and a helical shape with a winding wound in a thickness direction. Each coil may be not only a winding coil configured of a conductive wire rod, but also a conductive pattern coil configured of a printed circuit board or a flexible printed circuit board.

Further, although the above-described embodiment has been described with electronic units as an example of the power-feeding objective unit, the power-feeding objective unit is not limited thereto, and may be a unit (for example, a vehicle such as an electric car) other than the electronic units.

In addition, although the above-described embodiment has been described with the specific components of the power feeding unit and the electronic units, it is not necessary to provide all of the components. Also, other components may be further provided. For example, the power feeding unit or the electronic units may incorporate a communication function, a certain control function, a display function, an authentication function of a secondary unit, a function of determining that a secondary unit is located on a primary unit, and a function of detecting contamination of a dissimilar metal, etc.

Also, although the above-described embodiment has been described with an exemplary case where a plurality of (two) electronic units are provided in the power feeding system, such a case is not limitative, and only one electronic unit may be provided in the power feeding system.

Furthermore, although the above-described embodiment has been described with a charging tray for a small electronic unit (CE unit) such as a mobile phone as an example of the power feeding unit, the power feeding unit is not limited to such a household charging tray, and may be applicable as a charger of any of various electronic units. Moreover, the power feeding unit may not necessarily be a tray, and may be, for example, a stand for an electronic unit, such as a so-called cradle.

(Example of Performing Power Transmission in Noncontact Manner Using Electric Field)

Although the above-described embodiment has been described with an exemplary case of the power feeding system that performs power transmission (power feeding) from the power feeding unit as a primary unit to the electronic unit as a secondary unit in a noncontact manner with a magnetic field, this is not limitative. Specifically, the contents of the disclosure are applicable to a power feeding system that performs power transmission from a power feeding unit as a primary unit to an electronic unit as a secondary unit in a noncontact manner with an electric field (electric field coupling). In such a case, effects similar to those in the above-described embodiment are allowed to be obtained.

Figure 12:
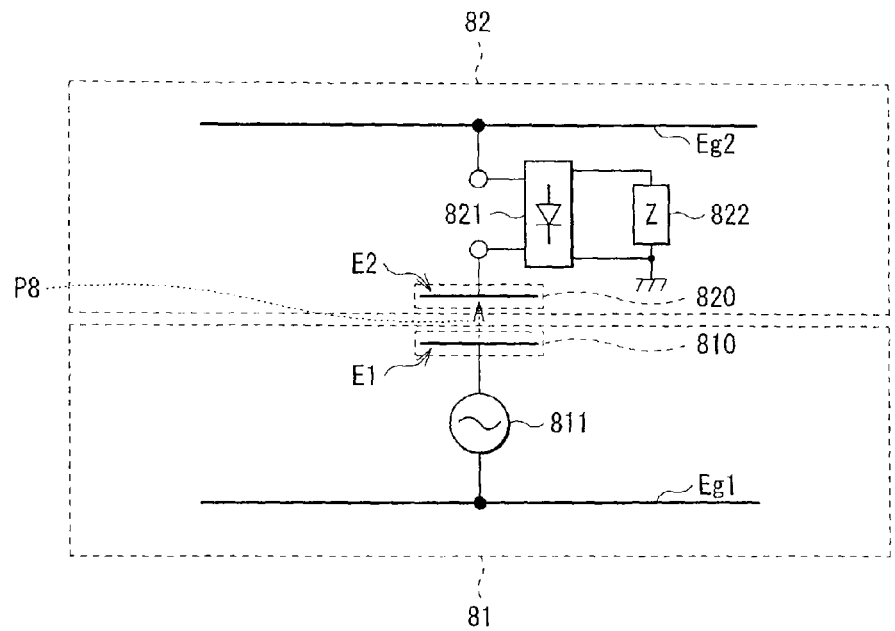
FIG. 12 is a block diagram illustrating an exemplary schematic configuration of the power feeding system according to the modification.

Specifically, for example, a power feeding system illustrated in FIG. 12 includes one power feeding unit 81 (a primary unit) and one electronic unit 82 (a secondary unit). The power feeding unit 81 mainly includes an electricity transmission section 810 including an electricity transmission electrode E1 (a primary electrode), an AC signal source 811 (an oscillator), and an earth electrode Eg1. The electronic unit 82 mainly includes an electricity reception section 820 including an electricity reception electrode E2 (a secondary electrode), a rectifier circuit 821, a load 822, and an earth electrode Eg2. That is, this power feeding system includes two sets of electrodes, i.e., the electricity transmission electrode E1 and the electricity reception electrode E2, and the earth electrodes Eg1 and Eg2. In other words, the power feeding unit 81 (primary unit) and the electronic unit 82 (secondary unit) each incorporate an antenna configured of a pair of asymmetric electrode structures such as a monopole antenna.

Figure 13:
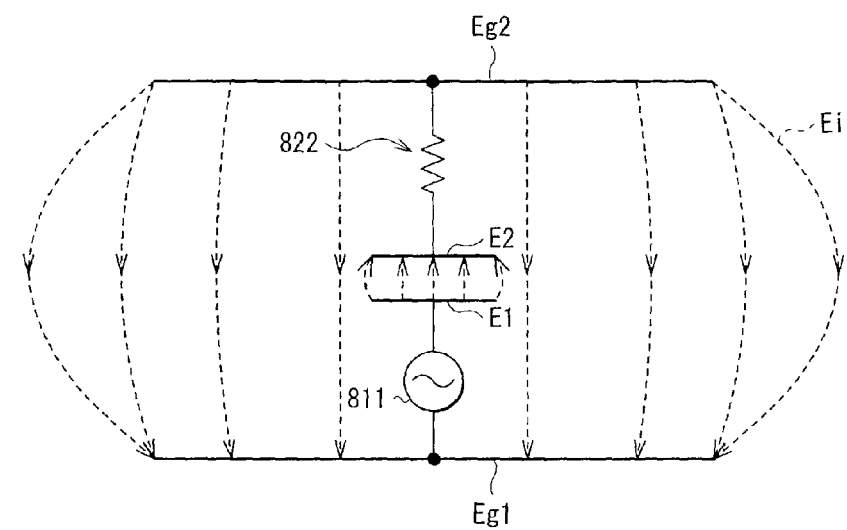
FIG. 13 is a schematic diagram illustrating an exemplary transmission mode of an electric field in the power feeding system illustrated in FIG. 12.

In the power feeding system having such a configuration, when the electricity transmission electrode E1 and the electricity reception electrode E2 are opposed to each other, the above-described noncontact antennas are coupled to each other (electrically coupled to each other along a vertical direction of each electrode). An induction electric field is therefore generated between the electrodes, so that power transmission using the electric field is performed (see power P8 illustrated in FIG. 12). Specifically, for example, as schematically illustrated in FIG. 13, the generated electric field (induction electric field Ei) is transmitted from the electricity transmission electrode E1 to the electricity reception electrode E2, while the generated induction electric field Ei is transmitted from the earth electrode Eg2 to the earth electrode Eg1. In other words, a loop path of the generated induction electric field Ei is formed between the primary unit and the secondary unit. In such a noncontact power supply system using the electric field, the effects similar to those in the above-described embodiment are also allowed to be obtained through use of the technique similar to that of the above-described embodiment.

The present technology may have the following configurations.

(1)

An electronic unit, including:

an electricity reception section configured to receive power transmitted using one of a magnetic field and an electric field;

a secondary battery configured to be charged based on a received power received by the electricity reception section; and a state notification section configured to provide notification to outside as to a state of its own unit, wherein a charging period during which the secondary battery is charged based on the received power and a non-charging period are set in a time-divisional manner, and the state notification section notifies of the unit state based on the received power in both of the charging period and the non-charging period.

(2)

The electronic unit according to (1), further including a charging section configured to charge the secondary battery based on the received power, wherein, in the non-charging period, the state notification section notifies of the unit state using part of charging power stored in the secondary battery based on the received power.

(3)

The electronic unit according to (2), wherein the state notification section includes:

a lighting section configured to notify of the unit state in accordance with a lighting state; and a lighting control section configured to control a lighting state of the lighting section using the received power.

(4)

The electronic unit according to (3), further including a control section configured to perform predetermined control in the unit, wherein the lighting control section controls the lighting state using the received power in the charging period, and the control section controls the lighting state using part of the charging power in the non-charging period.

(5)

The electronic unit according to (4), wherein the control section further controls the lighting state using part of the charging power in an overlapping period with the charging period, the overlapping period being set in one or both of periods before and after the non-charging period.

(6)

The electronic unit according to any one of (2) to (5), wherein the non-charging period is a communication period in which predetermined communication is performed with a power feeding unit configured to perform the power transmission.

(7)

The electronic unit according to (6), wherein, in the communication period, supply of the received power is stopped to each of the charging section, the state notification section, and a load located in a downstream of the charging section and the state notification section.

(8)

The electronic unit according to (6) or (7), wherein the communication period is continuously set after the secondary battery has been charged by the charging section.

(9)

The electronic unit according to (8), wherein the communication period is set at a lower frequency in the period after completion of charging than in the charging period of the secondary battery.

(10)

The electronic unit according to any one of (2) to (9), wherein the state notification section separately notifies of states as the unit state, the states being a state during charging by the charging section and a state after completion of the charging.

(11)

The electronic unit according to (1), wherein in the non-charging period, the state notification section notifies of the unit state directly using part of the received power received during the non-charging period.

(12)

A power feeding system, including:
one or more electronic units; and
a power feeding unit configured to perform power transmission to the one or more electronic units using one of a magnetic field and an electric field,
the one or more electronic units including
an electricity reception section configured to receive power transmitted from the power feeding unit,
a secondary battery configured to be charged based on the received power received by the electricity reception section, and
a state notification section configured to provide notification to outside as to a state of its own unit,
wherein a charging period during which the secondary battery is charged based on the received power and a non-charging period are set in a time-divisional manner, and
the state notification section notifies of the unit state based on the received power in both of the charging period and the non-charging period.

This application claims the priority benefit of Japanese Patent Application JP 2011-262070 filed in the Japan Patent Office on Nov. 30, 2011 and Japanese Patent Application JP 2012-94336 filed in the Japan Patent Office on Apr. 18, 2012, the entire content of each of which is incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An electronic unit, comprising:
an electricity reception section configured to receive power transmitted using one of a magnetic field and an electric field;
a secondary battery configured to be charged based on a received power received by the electricity reception section; and
a state notification section configured to provide notification to outside as to a state of the electronic unit,
wherein a charging period during which the secondary battery is charged based on the received power and a non-charging period are set in a time-divisional manner,
wherein a communication operation is performed with a power feeding unit in the non-charging period, and the communication operation is set at a lower frequency in a period after completion of charging than in the charging period of the secondary battery, and
wherein the state notification section notifies of the state based on the received power in both of the charging period and the non-charging period.

2. The electronic unit according to claim 1, further comprising a charging section configured to charge the secondary battery based on the received power,
wherein, in the non-charging period, the state notification section notifies of the state using part of charging power stored in the secondary battery based on the received power.

3. The electronic unit according to claim 2, wherein the state notification section includes:
a lighting section configured to notify of the state in accordance with a lighting state; and
a lighting control section configured to control the lighting state of the lighting section using the received power.

4. The electronic unit according to claim 3, further comprising a control section configured to perform predetermined control in the unit,
wherein the lighting control section controls the lighting state using the received power in the charging period, and
the control section controls the lighting state using part of the charging power in the non-charging period.

5. The electronic unit according to claim 4, wherein the control section further controls the lighting state using part of the charging power in an overlapping period with the charging period, the overlapping period being set in one or both of periods before and after the non-charging period.

6. The electronic unit according to claim 2, wherein the non-charging period is a communication period in which predetermined communication is performed with the power feeding unit configured to perform the power transmission.

7. The electronic unit according to claim 6, wherein, in the communication period, supply of the received power is stopped to each of the charging section, the state notification section, and a load located in a downstream of the charging section and the state notification section.

8. The electronic unit according to claim 6, wherein the communication period is continuously set after the secondary battery has been charged by the charging section.

9. The electronic unit according to claim 2, wherein the state notification section separately notifies of states as the state, the states being a state during charging by the charging section and a state after completion of the charging.

10. The electronic unit according to claim 1, wherein in the non-charging period, the state notification section notifies of the state directly using part of the received power received during the non-charging period.

11. The electronic unit according to claim 1, wherein the electricity reception section is configured to perform the communication operation during the non-charging period.

12. The electronic unit according to claim 1, wherein, during the communication operation, an authentication of the electronic unit to the power feeding unit is performed.

13. A power feeding system, comprising:
one or more electronic units; and
a power feeding unit configured to perform power transmission to the one or more electronic units using one of a magnetic field and an electric field,
each of the one or more electronic units including:
an electricity reception section configured to receive power transmitted from the power feeding unit,
a secondary battery configured to be charged based on the received power, and
a state notification section configured to provide notification to outside as to a state of the respective electronic unit,
wherein a charging period during which the secondary battery is charged based on the received power and a non-charging period are set in a time-divisional manner;

wherein a communication operation is performed with the power feeding unit in the non-charging period, and the communication operation is set at a lower frequency in a period after completion of charging than in the charging period of the secondary battery, and wherein the state notification section notifies of the state based on the received power in both of the charging period and the non-charging period.

14. The power feeding system according to claim 13, wherein the power feeding unit is configured to perform authentication of the one or more electronic units, determine that the one or more electronic units are placed on the power feeding unit, and detect contamination caused due to a dissimilar metal.

* * * * *